J. C. TRULLINGER.
Wagon-Brake.

No. 164,344.  Patented June 8, 1875.

Witnesses.  Fig 4.  Inventor.
W. M. Edwards    John C. Trullinger
Ben F. Clark  per Fitch & Fitch
 Attys

UNITED STATES PATENT OFFICE.

JOHN C. TRULLINGER, OF PORTLAND, OREGON.

IMPROVEMENT IN WAGON-BRAKES.

Specification forming part of Letters Patent No. 164,344, dated June 8, 1875; application filed March 22, 1875.

*To all whom it may concern:*

Be it known that I, JOHN C. TRULLINGER, of the city of Portland, county of Multnomah and State of Oregon, have invented an Improved Brake, of which the following is a specification, reference being had to the accompanying drawings, forming a part of the same.

My invention relates to a brake applied to a wheel at or near the hub, or center, or at the side of the wheel, as contradistinguished from the rim or periphery of the wheel, and consists of a hinged clutch working in a channel or groove in the hub, or in a collar attached to the wheel, and operated by means of levers, connecting-rods and a rock-shaft, by means of which a similar clutch is operated on the wheel at the opposite end of the same axle.

Figure 1:
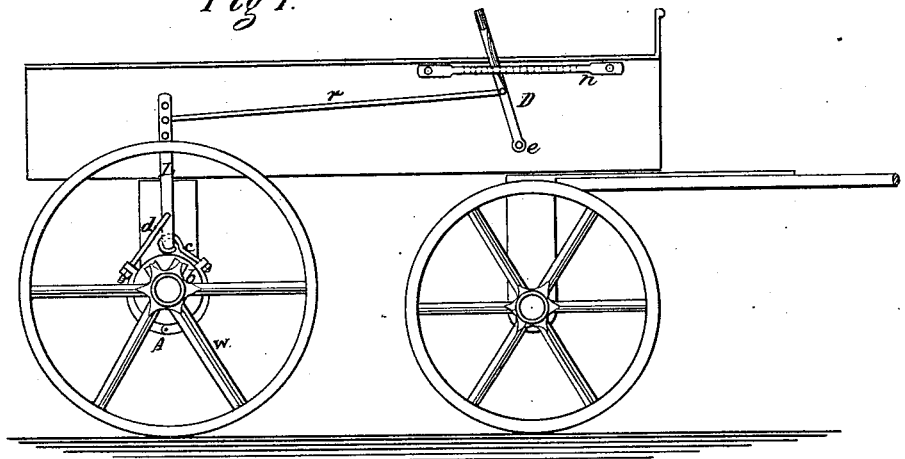
Figure 2:
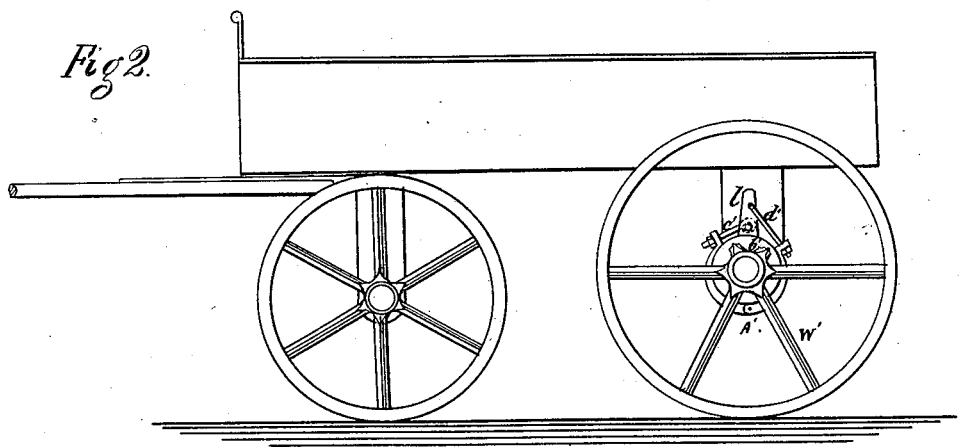
Figure 3:
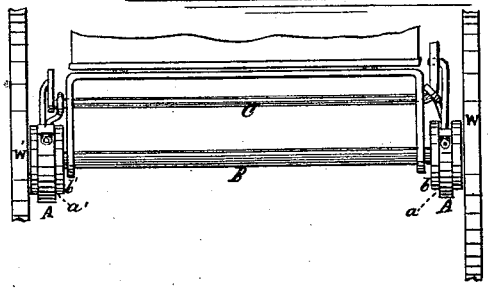
Figure 3:

Figure 1 is a side elevation of a vehicle having my brake arranged to operate on the rear wheels. Fig. 2 is a similar view of the same, showing the arrangement of my brake upon the wheel at the opposite end of the same axle. Fig. 3 is a rear view of the same, showing the arrangement of the rock-shaft. Fig. 4 is a central sectional view of the hub of the wheel, showing the channel or groove in which the clutch is arranged.

A and A' are hinged clutches arranged in grooves or channels $a$ and $a'$, shown plainly in Fig. 4, cut in the hubs $b$ and $b'$ of the wheels W and W' upon the opposite ends of the axle B. C is a rock-shaft extending in a line with the axle B across the vehicle from one hub to the other, and has formed or secured upon one end the long lever L and upon its opposite end the short lever $l$. $c$ and $c'$ are connecting-rods bolted at one end, respectively, upon one of the sides of the hinged clutches A and A', and having their opposite ends hinged upon the rock-shaft $c$. $d$ and $d'$ are connecting-rods bolted at one end respectively, upon one of the other sides of the clutches A and A', and having their opposite ends jointed into the long lever L and the short lever $l$, respectively. The long lever L is connected with the operating-lever D by the rod $r$, the said lever D being pivoted upon the vehicle at $e$ and working against a notched bar, $n$.

Now, it is evident that by means of the lever D, the long lever L may be operated to close the clutch A working in the channel $a$ upon the hub $b$ by the movement of the rods $c$ and $d$, and that the long lever L, operating to turn the rock-shaft C, will cause the clutch A' working in the channel $a'$ to close upon the hub $b'$ by the movement of the short lever $l$ and the connecting-rods $c'$ and $d'$.

It is also evident that the amount of friction to be applied by the clutch may be varied at the desire of the operator by means of the lever D, and that the clutch may be held in any desired position by means of the notched bar $n$, with which the lever D is arranged to engage.

It is also evident that a collar of any desired circumference may be secured upon the hub or upon the side of the wheel, and my clutch arranged in and applied thereto as a brake, in the manner I have described.

I am aware that brakes have been heretofore applied at or near the hub of the wheel, and I therefore do not claim broadly a brake applied at or near the hub; but I intend to limit my claim to the devices hereinbefore shown and described, where the same are employed to apply friction as a brake at or near the hub as contradistinguished from the rim of the wheel.

What I claim as my invention, and desire to secure by Letters Patent, is—

In a wagon-brake, the combination of the clutch A, the hub $b$; the rock-shaft C, the levers L and $l$, and the connecting-rods $c$ and $d$, whereby friction is applied to the wheels of a vehicle at the hub or side of the wheel, substantially as set forth.

JOHN C. TRULLINGER.

Witnesses:
    RALEIGH STOTT,
    C. A. BALL.